(12) United States Patent
Rudy et al.

(10) Patent No.: US 7,895,766 B2
(45) Date of Patent: Mar. 1, 2011

(54) LINEAR GUIDE UNIT HAVING A LENGTH MEASUREMENT SYSTEM

(75) Inventors: Dietmar Rudy, Kleinbundenbach (DE); Martin Menges, Homburg (DE)

(73) Assignee: Schaeffler KG, Herzogenaurach (DE)

( * ) Notice: Subject to any disclaimer, the term of this patent is extended or adjusted under 35 U.S.C. 154(b) by 254 days.

(21) Appl. No.: 12/223,312

(22) PCT Filed: Dec. 13, 2006

(86) PCT No.: PCT/EP2006/069673

§ 371 (c)(1),
(2), (4) Date: Aug. 6, 2008

(87) PCT Pub. No.: WO2007/085329

PCT Pub. Date: Aug. 2, 2007

(65) Prior Publication Data

US 2010/0175272 A1      Jul. 15, 2010

(30) Foreign Application Priority Data

Jan. 27, 2006   (DE) ..................... 10 2006 003 980

(51) Int. Cl.
*G01B 7/00* (2006.01)
(52) U.S. Cl. .......................... 33/708; 33/706
(58) Field of Classification Search ............ 33/700, 33/701, 703, 705–708, 1 M; 384/43–45
See application file for complete search history.

(56) References Cited

U.S. PATENT DOCUMENTS

| | | | |
|---|---|---|---|
| 4,100,485 A | 7/1978 | Rogers | |
| 4,103,222 A * | 7/1978 | Phillips et al. | 324/207.17 |
| 4,649,648 A * | 3/1987 | Nagaoka et al. | 33/700 |
| 4,843,729 A | 7/1989 | Nagaoka | |
| 6,034,624 A | 3/2000 | Goto | |
| 6,769,195 B2 * | 8/2004 | Huber et al. | 33/706 |
| 6,909,280 B1 | 6/2005 | Hudman | |
| 7,121,015 B2 * | 10/2006 | Boge | 33/707 |
| 2008/0189972 A1 * | 8/2008 | Rudy et al. | 33/810 |

FOREIGN PATENT DOCUMENTS

| | | |
|---|---|---|
| DE | 199 22 363 A1 | 11/2000 |
| DE | 102 14 427 A1 | 10/2003 |
| DE | 102 36 381 A1 | 2/2004 |
| EP | 0 386 477 B1 | 2/1990 |
| EP | 0 709 655 A2 | 5/1996 |
| EP | 0 795 738 A1 | 3/1997 |
| GB | 1 513 567 A | 6/1978 |
| GB | 2 340 242 | 7/1998 |
| GB | 2 343 517 | 11/1998 |
| GB | 2 377 497 | 7/2001 |
| GB | 2 392 503 | 9/2002 |
| WO | WO 2006/117096 A | 11/2006 |

* cited by examiner

*Primary Examiner*—Amy Cohen Johnson
(74) *Attorney, Agent, or Firm*—Charles A. Muserlian

(57) ABSTRACT

Linear guide unit, having a guide carriage (2) which is arranged such that it can be displaced longitudinally on a guide rail (1), and having a length measurement system, the measuring head (3) of which interacts with a measuring scale (4) which is arranged parallel to the guide rail (1), the measuring scale (4) being arranged in a hollow body which carries the measuring scale (4), is arranged at a spacing from the guide rail (1) and is mounted at its ends.

7 Claims, 2 Drawing Sheets

LINEAR GUIDE UNIT HAVING A LENGTH MEASUREMENT SYSTEM

Figure 1:
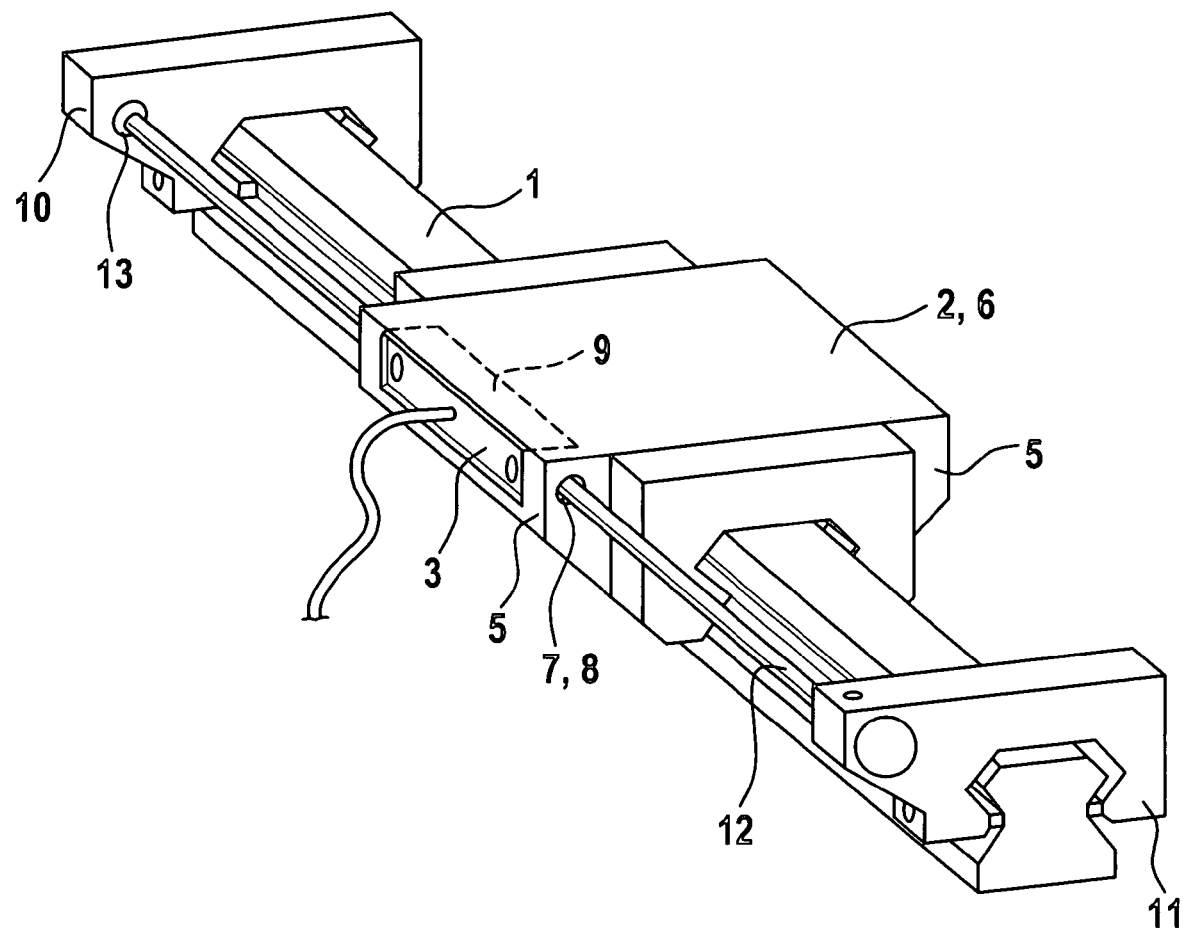

This application is a 371 of PCT/EP2006/069673 filed Dec. 13, 2006.

The present invention relates to a linear guide unit which is provided with a length measurement system. Linear guide units of this type are used, for example, in machine tool manufacture or in transport apparatuses of assembly lines or in wood processing. The length measurement systems make highly accurate positioning of the guide carriages possible at predefined positions.

For example, DE 199 41 587 A1 has disclosed a linear bearing having a device for measuring, a guide carriage being arranged such that it can be displaced longitudinally on a guide rail. The guide carriage is provided with a measuring head on the end side. On its upper side, the guide rail is provided with a groove, into which a measuring scale is inserted. Here, the measuring scale is configured in one piece with a covering band which is held nonpositively in the groove of the guide rail. As an alternative, the measuring scale can be adhesively bonded to the flat band. Should it become necessary to change the measuring scale, this is done only by exchanging the measuring scale with the covering band.

In other known linear bearings having integrated measurement systems, the scale or the measuring scale is adhesively bonded to the guide rail in the delivery state. In this case, exchanging a measuring scale without exchanging the guide rail is possible only with great difficulty.

It is an object of the present invention to specify a linear guide unit according to the features of the precharacterizing clause of claim 1, in which it is possible to exchange the measuring scale without problems. According to the invention, this object is achieved by the fact that the measuring scale is arranged in a hollow body which carries the measuring scale, is arranged at a spacing from the guide rail and is mounted at its ends.

The invention affords a plurality of advantages. Firstly, it is ensured that the measuring scale can be exchanged independently of the guide rail. Neither the guide rail need be released nor a covering band removed in order to change the measuring scale. The measuring scale to be exchanged need only be removed from the hollow body (for example, a tube) and replaced by another measuring scale.

Furthermore, linear guide units having very large movement paths can be realized, without additional supports being required for the measuring scale in order to avoid undesired sagging of the measuring scale; this is because the measuring scale need only be inserted into the hollow body, in which it is then supported uniformly over its entire longitudinal extent. In order to insert the measuring scale into the hollow body without problems, it may be expedient to use a lubricant which reduces the sliding friction during the contact of the measuring scale with the inner wall of the hollow body.

A further advantage can be seen in the fact that the measuring scale can be arranged within the clearance profile of the linear guide unit. The width and the height of the clearance profile of linear guide units are described in DIN 645-1 and DIN 645-2 in the form of a table, in which standardized sizes of the guide carriage are specified. The manufacturers of linear guide units have to adhere to DIN. For users of linear guide units of this type, the advantage of standardization is shown in the fact that this standard can be accessed for the planning, for example, of assembly lines and the required installation space for the linear guidance of objects can be planned satisfactorily. The integration of the measuring scale within the clearance profile therefore does not restrict the applicability of this standard in any way.

A further advantage can be seen in the fact that the measuring scale is protected in the hollow body against contact, for example, with metal chips or liquids.

A further particular advantage can be seen in the fact that the selection from the known length measurement systems is not restricted by the fact that the guide rail is usually manufactured from steel. If the length measurement system is based on the inductive measurement principle, this measurement principle cannot be used without special additional measures; this is because the guide rail which is usually formed from magnetic steel would at least make a satisfactory measurement difficult. In the solution according to the invention, in contrast, it is sufficient in this case to form the hollow body from a suitable material, for example plastic or nonmagnetic steel.

If large movement paths are to be realized, it can be expedient to clamp in a clamping sleeve axially which forms the hollow body. The clamping sleeve can be mounted at its two ends in each case on a bearing block and can be loaded with a tensile stress between these bearing blocks. The tensile stress assists a satisfactory linear arrangement of the measuring scale because it avoids sagging or flexing of the clamping sleeve which carries the measuring scale.

The tensile stress can be applied with the aid of a clamping device. In one advantageous embodiment, the clamping device has a clamping nut which is screwed onto a screw thread which is provided at one end of the clamping sleeve. This screw thread can be attached directly to the shell of the clamping sleeve, but it can also be formed on a separate threaded sleeve which is placed onto one end of the clamping sleeve and is fastened thereto, for example welded.

The hollow body which is configured as a tube or a clamping sleeve is preferably mounted at its two ends in each case on a bearing block which can be formed, for example, by a prism. The abovementioned clamping nut can be supported axially on one of said bearing blocks, in order to transmit the axial tensile force of the clamped clamping sleeve to one bearing block. The clamping sleeve is then likewise supported axially at its other end on the other bearing block.

It has been shown that length measurement systems which are based on the inductive measurement principle are particularly favorable for the present invention. In the inductive measurement principle, the measuring scale can have, for example, a stainless steel tube which is filled with a multiplicity of chrome nickel elements which are arranged behind one another. In this case, the measuring head can be, for example, a cast aluminum part which comprises a coil assembly and electronics. The measuring head can reach annularly around the tubular measuring scale. The measuring head can be provided with a multiplicity of receiver coil sets. Each set can comprise four identical turns which are arranged at spacings of one scale division. On account of this spacing, each coil is positioned in a set over an identical part of an adjacent chrome nickel element. All the coils of a set are connected in series. The actuating coil is situated over the sensing coils. The magnetic conductivity of the measuring rod changes periodically over one scale division as a result of the chrome nickel element in the measuring rod. The voltage which is induced in each group of sensing coils changes according to the relative positions of the coils with respect to the chrome nickel elements which lie under them. The coils are at such a spacing that, when one group of coils is at the maximum, another group which is at a distance of a half chrome nickel element scale division is at the minimum. These pairs of coils are combined differentially, in order to generate signals which change with the displacement. These combined signals are phase shifted by the electronic circuits in the measuring head. The signals are added and filtered. The result is an output signal, the phase of which changes when the measuring head is displaced along the measuring scale.

The hollow body which is provided according to the invention is advantageously formed from nonmagnetic material. This ensures that magnetic field lines, as occur in the above-described measurement principle, are not disrupted.

Figure 2:
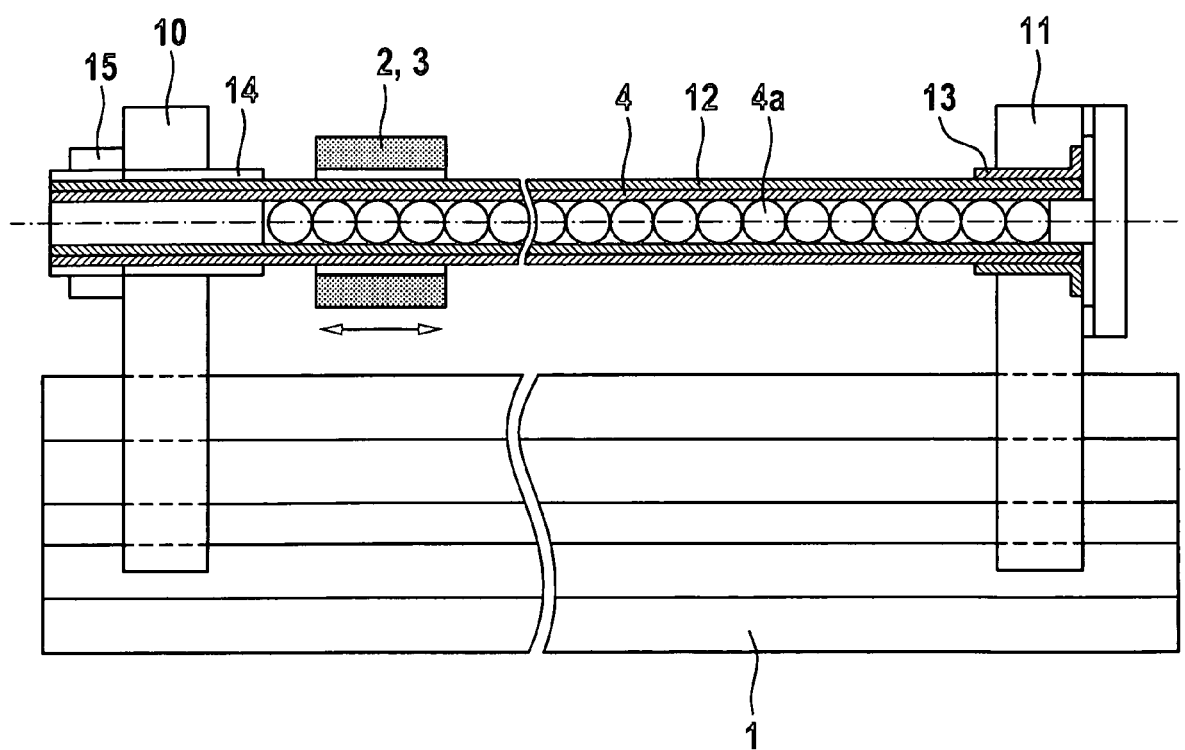

In the following text, the invention will be explained in greater detail using an exemplary embodiment which is depicted in a total of two figures, in which:

FIG. 1 shows a linear guide unit according to the invention in a perspective illustration, and FIG. 2 shows a diagrammatic illustration of the linear guide unit according to the invention in a partial longitudinal section.

The linear guide unit according to the invention which is depicted in FIGS. 1 and 2 has a guide carriage 2 which is guided such that it can be displaced longitudinally on a guide rail 1. In a known manner, rolling bodies (not shown here in further detail) roll on raceways of the guide rail and the guide carriage under load. Said raceways delimit a loadbearing channel. The rolling bodies circulate in endless rolling body channels, each rolling body channel having the abovementioned loadbearing channel, a return channel and two deflection channels which connect the return channel and the loadbearing channel in an endless manner. The deflection channels and the return channels are provided completely in the guide carriage 2.

The guide carriage 2 engages around the guide rail 1 by way of its two limbs 5, the two limbs 5 being connected to one another via a back 6. A through opening 7, through which one clamping sleeve 12 is guided, is formed on one limb 5. In the present case, said through opening 7 is configured as a hole 8. Said limb 5 is additionally provided with a recess 9 (indicated here only in a dashed manner), into which a measuring head 3 of a length measurement device is inserted.

The clamping sleeve 12 is mounted at its two ends in each case on a bearing block 10, 11, which are both configured as locating bearings. The guide rail 1 has a prismatic profile as viewed in cross section. The bearing blocks 10, 11 are provided with a corresponding prism profile, with the result that the bearing blocks 10, 11 are oriented satisfactorily on the guide rail 1. The satisfactory orientation of the bearing blocks 10, 11 ensures that the clamping sleeve 12 is arranged satisfactorily parallel to the guide rail 1.

Furthermore, the linear guide unit according to the invention comprises the length measurement system which has a measuring head 3 and a measuring scale 4 which is depicted clearly in FIG. 2. Said length measurement system operates according to the induction principle. Said measuring scale 4 has a stainless steel tube, in which a multiplicity of chrome nickel elements 4a are arranged which are arranged at a predefined spacing. The measuring head 3 is equipped in such a way that, in the event of a relative displacement between the measuring scale 4 and the measuring head 3, sinusoidal signals are generated which are used for evaluation. Said measuring scales 4 can be accommodated favorably within the clearance profile of the guide carriage 2 and therefore also within the clearance profile of the linear guide unit.

The measuring scale 4 is arranged in the clamping sleeve 12 which is formed from nonmagnetic material. The measuring scale 4 is supported over its entire extent on the clamping sleeve 12 and is protected in it.

The clamping sleeve 12 is fixed at its one end on one bearing block 11. For this purpose, said end is provided with a holding sleeve 13 which is supported axially on the bearing block 11. A threaded sleeve 14 is welded to the other end of the clamping sleeve 12. A clamping nut 15 which is supported axially on the bearing block 10 is screwed onto the threaded sleeve 14. An axial tensile stress can be applied to the clamping sleeve 12 by a screwing movement of the clamping nut 15, with the result that sagging of the clamping sleeve 12 is ruled out in any case.

As an alternative to the clamping sleeve, a tube can also be used which is fixed on one bearing block 11 as in the case of the clamping sleeve. The other end of said tube is mounted on the bearing block 10 in the manner of a floating bearing, however. Tubes of this type can be used if sagging of the tube can be ruled out, for example, on account of a reduced tube length or because of sufficient tube rigidity.

The invention claimed is:

1. A linear guide unit, having a guide carriage which is arranged such that the guide carriage can be displaced longitudinally on a guide rail, and having a length measurement system, a measuring head of which interacts with a measuring scale which is arranged parallel to the guide rail, characterized in that the measuring scale is arranged in a hollow body which carries the measuring scale and is arranged at a spacing from the guide rail and is mounted each end, wherein the measuring scale is arranged in a clamping sleeve which forms the hollow body and is mounted at each end with axial tensile stress.

2. The linear guide unit of claim 1, wherein a clamping device is provided for loading the clamping sleeve with tensile stress.

3. The linear guide unit of claim 2, wherein the clamping device has a clamping nut which is screwed onto a screw thread which is provided at one end of the clamping sleeve.

4. The linear guide unit of claim 3, wherein a threaded sleeve is placed firmly onto one end of the clamping sleeve and is fastened thereto.

5. The linear guide unit of claim 3, wherein each end of the clamping sleeve is mounted on a bearing block the clamping nut being supported axially on the bearing block.

6. The linear guide unit of claim 3, wherein the measuring scale is a stainless steel tube which is filled with a multiplicity of chrome nickel elements which are arranged behind one another.

7. A linear guide unit, having a guide carriage which is arranged such that the guide carriage can be displaced longitudinally on a guide rail, and having a length measurement system, a measuring head of which interacts with a measuring scale which is arranged parallel to the guide rail, characterized in that the measuring scale is arranged in a hollow body which carries the measuring scale and is arranged at a spacing from the guide rail and is mounted at each end with axial tensile stress, and wherein the hollow body is formed from a nonmagnetic material.

* * * * *